UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

INSULATING COMPOSITION.

1,156,452.  Specification of Letters Patent.  Patented Oct. 12, 1915.

No Drawing.  Application filed October 24, 1911. Serial No. 656,491.

*To all whom it may concern:*

Be it known that I, LEO H. BAEKELAND, a citizen of the United States, residing at Yonkers, in the county of Westchester and State of New York, have invented certain new and useful Improvements in Insulating Compositions, of which the following is a specification.

Certain condensation products of phenols and formaldehyde have received, on account of their infusibility and insulating properties, important applications in electrical engineering. These substances, as heretofore used, have, however, certain decided drawbacks, which considerably interfere with some of their electrical uses. For instance, the act of hardening, or polymerization, is accompanied by a considerable reduction in volume or shrinkage; moreover, the final product is hard and inflexible, and does not lend itself readily to bending. Furthermore, the temporarily fusible and soluble initial condensation products, which constitute the preferred starting point for the formation of the infusible end products, and which are used in liquid form for the impregnation of coils, contain usually more or less large quantities of water, or of free phenolic bodies, or both together, or of solvents. It is a known fact that the presence of water, or free phenolic bodies or other bodies containing hydroxyl groups is detrimental for insulating purposes, where alternating currents of high voltage are used. If we try to eliminate the above impurities by evaporation, the mass becomes so thick as to render it unsuitable for impregnation purposes. If in order to liquefy the mass, heat be applied, the first effect of the heat may indeed produce a more liquid condition, but this is rapidly followed by objectionable thickening, on account of polymerization. This thickening can be prevented by the introduction of a certain amount of alcohol or acetone or similar liquids, these solvents then forming with the initial products of condensation, a solution or varnish. But if the desired fluidity is thus insured, the other drawbacks are not eliminated. For instance, these low-boiling-point solvents are expelled by evaporation, and this brings about a still further increase in the shrinkage of the final product. In other terms, the cause of shrinkage will then be twofold; first, the shrinkage determined by polymerization and the resulting reduction of volume; second, the shrinkage superinduced by the evaporation of the liquid. The effect of shrinkage may become so decided that it develops cracks, voids and deformations, and irregular tension stresses in the interior of the mass. These factors are liable to cause serious irregularities in the impregnation of electric coils, thus treated; for instance, interior voids or air-holes. These air-holes are dangerous, not only on account of imperfect insulation, but more especially because in case of overload, they become points of maximum over-heating by the fact that air is a poorer conductor of heat than the impregnating material itself: hence local "burnouts" may result. But even if all above-mentioned defects did not exist, we are still confronted with the fact that the impregnating material is unusually hard and inflexible, and that wires, or other conductors coated with the same, or embedded therein, cannot well be bent or removed without cracking the insulating material. This factor is specially objectionable when repairs have to be made on impregnated coils, where the wires or conductors are practically embedded in a hard mass, from which they can only be removed with great difficulty, and at the almost unavoidable risk of spoiling the whole construction.

I have eliminated these difficulties by adding to the initial condensation products, before hardening, an appropriate liquid or liquefiable solvent of high boiling-point, of high dielectric properties, immiscible with water, and used in quantities sufficiently small, so that there is no necessity of expelling it by evaporation, so that it may remain for the greater part at least incorporated in the final mass, after the latter has solidified to a jelly, and this without disturbing its value as an insulator. Such a solvent brings about entirely new conditions. It gives a mass which is liquid at normal or somewhat higher temperatures and can be used as an impregnating fluid, and which can be heated gently for a relatively long time without the danger of too rapid thickening by polymerization at lower temperatures. This is probably due to the diluent action of the solvent, which reduces the speed of polymerization. This liquid solution, submitted to a gradually higher temperature, say from 70° to 90° or 100° C., or over, sets to a gelatin-like mass, of very desirable elasticity. But although this mass, solidified by heat, is elastic while it is hot, it is completely infusible. Very long application of heat may harden it further without, however, removing entirely the property of softening by heat which imparts to it elasticity or flexibility. This softening action of heat permits easy removal of damaged parts in dynamos, motors, coils, etc. All that is necessary to accomplish this is a local application of heat to soften the material to the point where it can easily be cut.

Owing to the fact that the solvent is entirely composed of substances which are immiscible with water and have no affinity for water, it is far less sensitive to moisture than if water-absorbing substances, like free phenols, alcohol, glycerin, or similar materials were present. Furthermore, the elimination of water from the initial condensation products of phenols and formaldehyde in the preparation of my mixtures become a much easier problem than if the solvent itself had a tendency to retain water. On account of its high boiling-point, the solvent remains in the mass, harmless and unexpelled throughout the range of working temperatures, so that the objectionable reduction of volume, or shrinkage by evaporation, which occurs unavoidably whenever low-boiling-point solvents, like alcohol, are used, does not interfere; furthermore, it brings about the increased elasticity, a most desirable factor, which contributes still further to prevent interior stresses.

Another very important advantage is the fact that the active condensation product is diluted by a notable proportion of an inert solvent, which practically does not participate in the chemical action, so that the shrinkage by polymerization of the total mass is reduced to a very minimum, or to such a point that it is no longer objectionable. This shrinkage-reducing effect can be still further increased by the addition of solid, inert substances, or powdered fillers, as for instance, finely-powdered silex, china clay, baryta, certain oxids of iron, and in general such fillers as are good electrical insulators and possess also a fair degree of heat conductivity, thereby aiding in a most important function, viz., the p.eve on of overheating of dynamos, motors, or insulators. In this respect the composition is decidedly superior to ordinary resinous impregnating compounds.

The solvents used should have a boiling-point not below 120° C., and preferably a considerably higher boiling-point, say about 200° C., or over. If too much solvent be used, the solution does not become infusible or solidified by the application of heat, without first being submitted to evaporation to expel the excess of solvent. A suitably limited proportion of solvent, on the contrary, renders possible direct impregnation, with the liquefied mass, follows by solidification, through further application of heat, without the necessity of evaporating any excess of solvent. The solvent can be added to the initial soluble condensation products after the latter have been suitably relieved from free water or other objectionable impurities; or the solvent can be introduced directly at any stage of the reaction which engenders the soluble condensation products, and water can be eliminated afterward, by any known methods, before final hardening. Either in the initial reaction, or during the final act of rendering infusible by heat, so-called hardening agents, or condensation agents, may be used to good advantage, and these can be added at any phase of the process, and either before or after the solution has been made. But I find that the very best results are obtained by the use of alkalies or bases, for instance ammonia or amins or small amounts of sodium hydroxid as condensing or hardening agents.

For the impregnation of coils, I simply fill or impregnate the latter with the liquid mass according to known impregnation methods; then after impregnation has taken place, the coils are heated in a stove, raising the temperature gradually from 70° C. to 100° C., or above, taking care not to elevate the temperature too much until the impregnating liquid has coagulated to a gelatin-like mass, after which the temperature can be increased further until the product has acquired the desired consistence. Instead of heating in a stove, the heating can be carried out in a closed vessel, so that a counterpressure can be exerted during the heating, in which case the temperature can be increased very rapidly, and all operations can be performed quickly and with more regularity.

Another excellent use for the new composition consists in embedding induction coils, or other coils, in the mass, so as to exclude external penetration of moisture. For instance, induction coils, as used for motor boats or automobiles, are now frequently embedded in paraffin or similar materials which are readily liquefied by heat.

My new composition has obvious advantages over those heretofore used, because once hardened by heat it has lost the property of liquefying under further application of heat. My insulating mass can be hardened at a temperature lower than that at which wooden containers are affected by heat, so that the liquefied compound can simply be poured around the coil in the box and the whole submitted to solidification by a further application of heat, becoming sufficiently solid to support the coil under all conditions of use. It has the advantage over rubber compounds of not liberating sulfur.

Among the solvents which can be used for my purposes, I may mention naphthalene and anthracene or a mixture of both; these substances are relatively inexpensive and fulfil the desired requirements. They can be used alone, or together, but decidedly better in conjunction with other suitable solvents, for instance liquid cyclic hydrocarbons such as toluene, xylene, cumene, trimethylbenzene and their homologues, which are found mixed in the higher boiling liquid hydrocarbons extracted from coal tar, this mixture being usually termed "neutral oil." Sometimes it is found advantageous, in order to increase still further the fluidity of the impregnating mass, to add other liquid solvents immiscible with water and of high boiling-point, as for instance nitrobenzene, nitrotoluene, camphor-oil, terpenes, high-boiling-point ketones, etc., the words "high-boiling-point" referring to boiling temperatures of at least 120° C. In this process the boiling-points of the individual constituents of the solvent are of less importance than the boiling-point of the compound mixture of the solvent; so that cyclic hydrocarbons of relatively low boiling-point may be used in small proportion in conjunction with others of which the boiling-point is considerably higher, the mixture of both being thus rendered less volatile than if the low-boiling solvents were used alone.

If naphthalene be used alone and in large proportions, it has the disadvantage of giving to the product a crystalline texture and of escaping by sublimation under the action of heat. I obviate this difficulty by introducing into the mixture certain substances, for example liquid cyclic hydrocarbons, nitrobenzene, nitrotoluene, and the like. I have further found that whereas benzene, xylene, cumene, and similar hydrocarbons do not directly dissolve the initial condensation product, either solid or liquid, to a material extent, yet the presence of naphthalene renders it possible to prepare solutions in such liquid cyclic hydrocarbons. For example the initial condensation product may be directly dissolved in a mixture of naphthalene and a liquid cyclic hydrocarbon, or it may be first dissolved in melted naphthalene and the mixture further diluted or dissolved in the liquid hydrocarbons, as desired. In this process, instead of using phenol, I can use its homologues or mixtures thereof, or their equivalents, and instead of formaldehyde, I can use its polymers, or substances which engender formaldehyde in this reaction, or substances which are the technical equivalents of formaldehyde. Hexamethylenetetramin is equivalent to a mixture of formaldehyde and ammonia.

In order to further retard the hardening, or to reduce the shrinkage, I may add a limited amount of those anhydrous permanently fusible soluble condensation products of phenol and formaldehyde described by me in the *Journal of Industrial and Engineering Chemistry*, (vol. 1, No. 8, August, 1909), or other suitable fusible resinous matters, or natural resins; but whenever such natural or synthetic fusible resins are added, the proportion thereof should never be so large as to reach the point where the mass would lose its property of becoming infusible by sufficient application of heat. Instead of using directly an initial condensation product which is transformable by heat into an infusible product, such initial product may be formed indirectly in the mass by using a soluble, fusible condensation product in conjunction with formaldehyde, or an equivalent thereof, for example hexamethylenetetramin.

Certain illustrative compositions in accordance with the present invention are as follows, it being understood that the invention is not limited to the specific components or proportions mentioned in these illustrative examples:

*Example 1.*

| | Parts by weight. |
|---|---|
| Solid initial condensation product | 100 |
| Naphthalene | 30 |
| Commercial xylene or other suitable liquid cyclic hydrocarbon | 30 |

*Example 2.*

| | Parts by weight. |
|---|---|
| Solid initial condensation product | 100 |
| Naphthalene | 30 |
| Commercial xylene or other suitable liquid cyclic hydrocarbon | 30 |
| Nitrobenzene or nitrotoluene | 20 |

*Example 3.*

| | Parts by weight. |
|---|---|
| Solid initial condensation product | 100 |
| Naphthalene | 45 |
| Soluble, fusible condensation product of phenols and formaldehyde | 15 |

*Example 4.*

| | Parts by weight. |
|---|---|
| Novolak | 100 |
| Naphthalene | 30 |
| Commercial xylene or other suitable liquid cyclic hydrocarbon | 30 |
| Paraform | 3 |

*Example 5.*

| | Parts by weight. |
|---|---|
| Novolak | 100 |
| Naphthalene | 30 |
| Commercial xylene or other suitable liquid cyclic hydrocarbon | 30 |
| Hexamethylenetetramin | 4 |

In this application or in my claims I designate as "initial condensation product" any substances derived directly or indirectly from the condensation of phenols and formaldehyde, or their equivalents which are characterized by the fact that they are fusible or soluble and can be transformed by the action of heat into infusible bodies.

I claim:

1. An insulating composition for impregnating coils or like purposes, containing a phenolic condensation product and a solvent therefor, said solvent being immiscible with water, possessing high dielectric properties, and having a boiling-point above 120° C., the components of the composition proportioned to render the mass fluid or mobile at normal or somewhat higher temperatures, but transformable at higher temperatures into an infusible mass which is elastic while hot.

2. An insulating composition for impregnating coils or like purposes, containing a phenolic condensation product and a solvent therefor, said solvent being a liquid immiscible with water, possessing high dielectric properties, and having a boiling-point above 120° C., the components of the composition proportioned to render the mass fluid or mobile at normal or somewhat higher temperatures, but transformable at higher temperatures into an infusible mass which is elastic while hot.

3. An insulating composition for impregnating coils or like purposes, containing a phenolic condensation product and a solvent therefor, said solvent being immiscible with water, possessing high dielectric properties, having a boiling-point above 120° C., said condensation product and solvent proportioned to render the mass initially fluid or mobile at normal or somewhat higher temperatures, but transformable by heat, without substantial evaporation, into an infusible, more or less gelatinous mass, softening under the effects of heat.

4. An insulating composition for impregnating coils or like purposes, containing a phenolic condensation product and a solvent therefor, said solvent being immiscible with water, possessing high dielectric properties, having a boiling-point above 120° C., and containing a cyclic hydrocarbon, said condensation product and solvent proportioned to render the mass initially fluid or mobile at normal or somewhat higher temperatures, but transformable by heat, without substantial evaporation, into an infusible, more or less gelatinous mass, softening under the effects of heat.

5. An insulating composition for impregnating coils or like purposes, containing a phenolic condensation product and a solvent therefor, said solvent being a liquid immiscible with water, possessing high dielectric properties, having a boiling-point above 120° C., and containing a plurality of liquid cyclic hydrocarbons, said condensation product and solvent proportioned to render the mass initially fluid or mobile at normal or somewhat higher temperatures, but transformable by heat, without substantial evaporation, into an infusible, more or less gelatinous mass, softening under the effects of heat.

6. An insulating composition for impregnating coils or like purposes, containing a phenolic condensation product and a solvent therefor, said solvent being immiscible with water, possessing high dielectric properties, having a boiling-point above 120° C., and containing a liquid cyclic hydrocarbon and a solid hydrocarbon, said condensation product and solvent proportioned to render the mass initially fluid or mobile at normal or somewhat higher temperatures, but transformable by heat, without substantial evaporation, into an infusible, more or less gelatinous mass, softening under the effects of heat.

7. An insulating composition for impregnating coils or like purposes, containing a phenolic condensation product and a solvent therefor, said solvent being immiscible with water, possessing high dielectric properties, having a boiling-point above 120° C., and containing a liquid cyclic hydrocarbon and naphthalene, said condensation product and solvent proportioned to render the mass initially fluid or mobile at normal or somewhat higher temperatures, but transformable by heat, without substantial evaporation, into an infusible, more or less gelatinous mass, softening under the effects of heat.

8. An insulating composition for impregnating coils or like purposes, containing a phenolic condensation product and a solvent therefor, said solvent being immiscible with water, possessing high dielectric properties, having a boiling-point above 120° C., and containing a liquid cyclic hydrocarbon, naphthalene, and a comminuted inert filler, said condensation product and solvent proportioned to render the mass initially fluid or mobile at normal or somewhat higher temperatures, but transformable by heat, without substantial evaporation, into an infusible, more or less gelatinous mass, softening under the effects of heat.

In testimony whereof I affix my signature in presence of two witnesses.

LEO H. BAEKELAND.

Witnesses:
R. I. HULSIZER,
N. P. LEONARD.